United States Patent
Lee

(10) Patent No.: US 8,213,619 B2
(45) Date of Patent: Jul. 3, 2012

(54) METHOD AND APPARATUS FOR ESTABLISHING COMMUNICATION VIA SERVICE PROVIDER

(75) Inventor: Hak-goo Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 944 days.

(21) Appl. No.: 12/169,133

(22) Filed: Jul. 8, 2008

(65) Prior Publication Data

US 2009/0154706 A1 Jun. 18, 2009

(30) Foreign Application Priority Data

Dec. 14, 2007 (KR) ........................ 10-2007-0131080

(51) Int. Cl.
*H04L 9/08* (2006.01)
(52) U.S. Cl. .......................... 380/278; 713/168; 713/171
(58) Field of Classification Search .......... 380/277–278; 713/168, 171; 726/2
See application file for complete search history.

(56) References Cited

U.S. PATENT DOCUMENTS

| | | | |
|---|---|---|---|
| 7,116,786 B2* | 10/2006 | McKibben et al. | 380/286 |
| 7,702,898 B2* | 4/2010 | Tan | 713/150 |
| 7,716,483 B2* | 5/2010 | Sozzani et al. | 713/171 |
| 2004/0088551 A1* | 5/2004 | Dor et al. | 713/182 |
| 2007/0053520 A1* | 3/2007 | Eckleder | 380/278 |
| 2007/0200671 A1* | 8/2007 | Kelley et al. | 340/5.72 |

FOREIGN PATENT DOCUMENTS

JP 2005026963 A * 1/2005

* cited by examiner

*Primary Examiner* — Samson Lemma
(74) *Attorney, Agent, or Firm* — Staas & Halsey LLP

(57) ABSTRACT

Provided are a method and apparatus for establishing communication via a service provider providing a service of establishing communication between a transmitting terminal and a receiving terminal. The method includes receiving an encryption key from the service provider, transmitting the encryption key to an external device storing receiving terminal identification information required for establishing communication with the receiving terminal, receiving the encrypted receiving terminal identification information from the external device, and transmitting the encrypted receiving terminal identification information to the service provider.

26 Claims, 5 Drawing Sheets

METHOD AND APPARATUS FOR ESTABLISHING COMMUNICATION VIA SERVICE PROVIDER

CROSS-REFERENCE TO RELATED APPLICATION

This application claims the benefit of Korean Patent Application No. 2007-131080, filed Dec. 14, 2007 in the Korean Intellectual Property Office, the disclosure of which is incorporated herein in by reference.

BACKGROUND OF THE INVENTION

1. Field of the Invention

Aspects of the present invention relate to a method and an apparatus for establishing communication between a transmitting terminal and a receiving terminal, and more particularly, to a method and an apparatus for establishing communication via a service provider providing a service of establishing communication between a transmitting terminal and a receiving terminal.

2. Description of the Related Art

It is often difficult to park a vehicle due to vehicles temporarily parked in residential areas or at roadsides. In such cases, a method of contacting owners of the temporarily parked vehicles is necessary. In a conventional method, a vehicle owner writes a note containing his or her contact information and leaves the note at a prominent place inside the vehicle, such as the inside of the windscreen, so that the vehicle owner can be contacted using the contact information.

However, if the contact information is exposed to the public, the contact information may be abused and vehicle owner may receive spam mails or the like. Therefore, a system of establishing communication with a vehicle owner without exposing contact information of the vehicle owner is necessary.

SUMMARY OF THE INVENTION

Aspects of the present invention provide a method and an apparatus for establishing communication between a transmitting terminal and a receiving terminal without exposing identification information of the receiving terminal.

According to an aspect of the present invention, there is provided a method of establishing communication via service provider, providing a service of establishing communication between the transmitting terminal and the receiving terminal, the method including receiving an encryption key from the service provider, transmitting the encryption key to an external device storing receiving terminal identification information required for establishing communication to the receiving terminal, receiving the encrypted receiving terminal identification information encrypted by using the encryption key from the external device, and transmitting the encrypted receiving terminal identification information to the service provider.

According to an aspect of the invention, the receiving terminal identification information may include at least one of a cellular phone number of the receiving terminal, an e-mail address of a user of the receiving terminal, and a device identifier specifying the receiving terminal.

According to an aspect of the invention, the method of establishing communication via service provider according to the present invention may further include requesting the encryption key.

According to an aspect of the invention, the request of the encryption key requests the encryption key by transmitting a message composed of at least one number and one letter either to the external device or to the service provider.

According to an aspect of the invention, the service provider may possess a list of unauthorized transmitting terminals to block communication between an unauthorized transmitting terminal and the receiving terminal.

According to an aspect of the invention, the reception of the encryption key and the transmission of the encrypted receiving terminal identification information to the service provider may be carried out by using a digital wireless communication, and the transmission of the encryption key to the external device and the reception of the encrypted receiving terminal identification information may be carried out by using a short distance wireless communication.

According to another aspect of the present invention, there is provided a method of transmitting receiving terminal identification information, required for establishing communication between a transmitting terminal and a receiving terminal, the method including receiving an encryption key from the transmitting terminal, encrypting the receiving terminal identification information by using the encryption key, and transmitting the encrypted receiving terminal identification information to the transmitting terminal.

According to an aspect of the invention, the encryption key may be an encryption key received by the transmitting terminal from a service provider providing a service of establishing communication between the transmitting terminal and the receiving terminal.

According to another aspect of the present invention, there is provided a device of establishing communication via a service provider, providing a service of establishing communication between a transmitting terminal and a receiving terminal, the device including a receiving unit receiving an encryption key from the service provider, and including a transmitting unit transmitting the encryption key to an external device storing an receiving terminal identification information required for establishing communication to the receiving terminal. The receiving unit receives the encrypted receiving terminal identification information from the external device encrypted by using the encryption key, and the transmitting unit transmits the encrypted receiving terminal identification information to the service provider.

According to an aspect of the invention, the device of establishing communication via a service provider may further include an encryption key requesting unit requesting the encryption key.

According to another aspect of the present invention, there is provided a receiving terminal identification information transmitting terminal, transmitting receiving terminal identification information required for establishing communication between a transmitting terminal and a receiving terminal, the receiving terminal identification information transmitting terminal including a receiving unit receiving an encryption key from the transmitting terminal, an encrypting unit encrypting the receiving terminal identification information by using the encryption key, and a transmitting unit transmitting encrypted receiving terminal identification information to the transmitting terminal.

According to another aspect of the present invention, there is provided a computer readable recording medium, having recorded thereon a computer program for executing the method of establishing communication via the service provider, providing the service of establishing communication between the transmitting terminal and the receiving terminal, the method including the reception of an encryption key from the service provider, transmission of the encryption key to the external device storing the receiving terminal identification information required for establishing communication to the receiving terminal, receiving the encrypted receiving terminal identification information encrypted by using the encryption key from the external device, and transmitting the encrypted receiving terminal identification information to the service provider.

According to another aspect of the present invention, there is provided a computer readable recording medium, having recorded thereon a computer program for executing the method of transmitting receiving terminal identification information, required for establishing communication between a transmitting terminal and a receiving terminal, the method including receiving an encryption key from the transmitting terminal, encrypting the receiving terminal identification information by using the encryption key, and transmitting the encrypted receiving terminal identification information to the transmitting terminal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
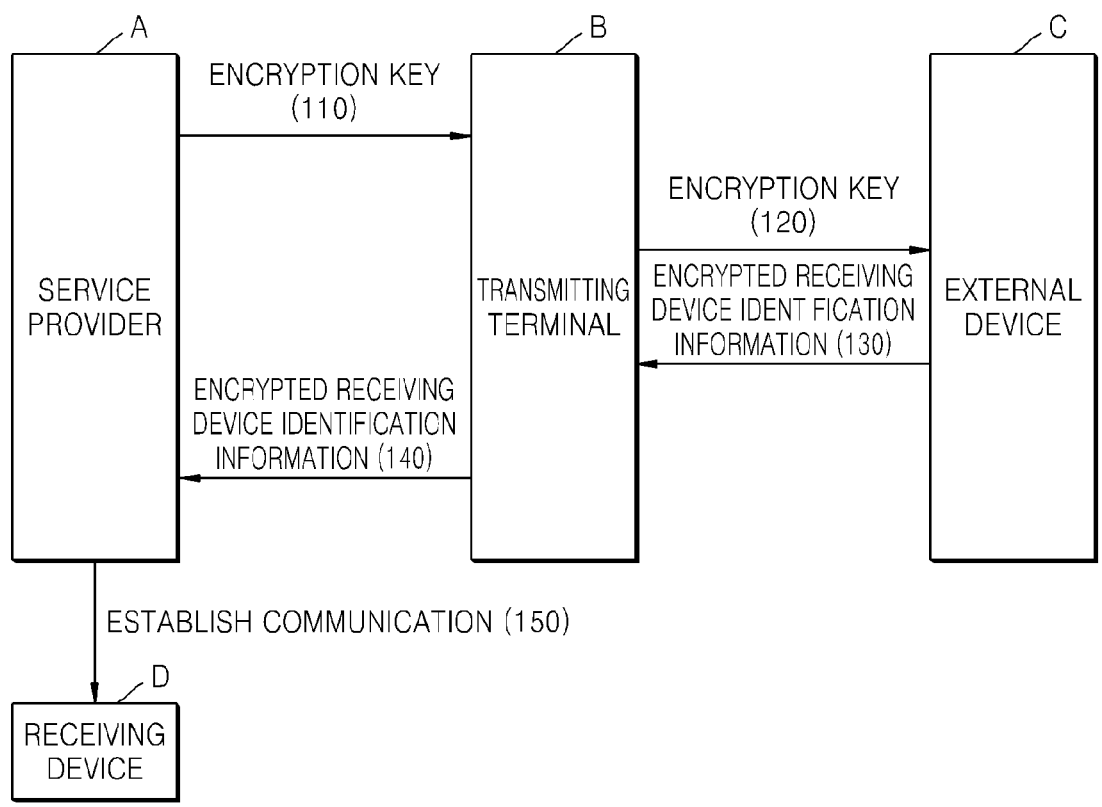
FIG. 1 is a diagram for describing a method of establishing communication via a service provider, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram for describing a method of establishing communication via a service provider, according to an embodiment of the present invention. Referring to FIG. 1, it is assumed that a transmitting terminal B includes an element capable of establishing communication according to the present invention. The transmitting terminal B may be any communication device capable of transmitting data, such as a cellular phone, a personal digital assistant (PDA), personal media player, portable computer, etc. Such transmission can be through wired and/or wireless mechanisms. Further, transmission is not limited to a type of cellular service, and can include any wireless communication technique used by mobile phones including combinations of short range, WiFi, and cellular communication techniques.

In operation 110, the transmitting terminal B receives an encryption key from a service provider A. The service providerA provides a service of establishing communication between the transmitting terminal B and a receiving terminal D.

In operation 120, the transmitting terminal B transmits the encryption key to an external device C storing receiving terminal identification information required for establishing communication with the receiving terminal D. The receiving terminal D denotes a device with which the transmitting terminal B wishes to establish communication. The receiving terminal identification information may be a phone number of the receiving terminal D, an e-mail address of a user of the receiving terminal D, a device identifier specifying the receiving terminal D, etc. The receiving terminal information can be stored in a memory of the external device C or connected to the device C.

The external device C may be installed in a vehicle, and the receiving terminal identification information stored in the external device C may be a cellular phone number of an owner of the vehicle. However, the installation location of the external device C is not limited to a vehicle, and the external device C may be installed in any location in which it is necessary to use the receiving terminal identification information. For instance, the external device C can be installed in a house, office, hotel, or other location at which people leave messages. For instance, the external device C could be left at a door of a house when the owner is not home, and allow a delivery person to contact the house owner to notify that the delivery person has arrived and needs entry to the house without leaving the homeowner's phone number or email address.

In operation 130, the external device C encrypts the receiving terminal identification information using the received encryption key, and transmits the encrypted receiving terminal identification information to the transmitting terminal B. In operation 140, the transmitting terminal B transmits the encrypted receiving terminal identification information to the service provider A. In operation 150, the service providerA decrypts the encrypted receiving terminal identification information to extract the receiving terminal identification information, and establishes communication between the transmitting terminal B and the receiving terminal D based on the receiving terminal identification information.

If the receiving terminal identification information is a phone number of the receiving terminal D, the service provider A promptly establishes communication between the transmitting terminal B and the receiving terminal D (i.e., dials the phone number and establishes a call from the transmitting terminal B to the receiving terminal D). However, if the receiving terminal identification information is either an e-mail address of a user of the receiving terminal D or a device identifier specifying the receiving terminal D, the service provider A searches a database to find a phone number of the receiving terminal D corresponding to either the e-mail address or the device identifier and establishes communication between the transmitting terminal B and the receiving terminal D based on the phone number of the receiving terminal D. However, it is understood that, instead of using the phone number to establish a voice communication, the service providerA could send an instant message, email, or other like non-voice communication between the transmitting terminal B and the receiving terminal D.

According to the present embodiment, communication may be established between the transmitting terminal B and the external device C by using a short distance wireless communication method (such as Bluetooth), while communication may be established between the transmitting terminal B and the service provider A by using a digital wireless communication method (such as CDMA). However, the communications need not be so limited, and the communication between the terminal B and device C can also be by digital wireless communication methods.

Figure 2:
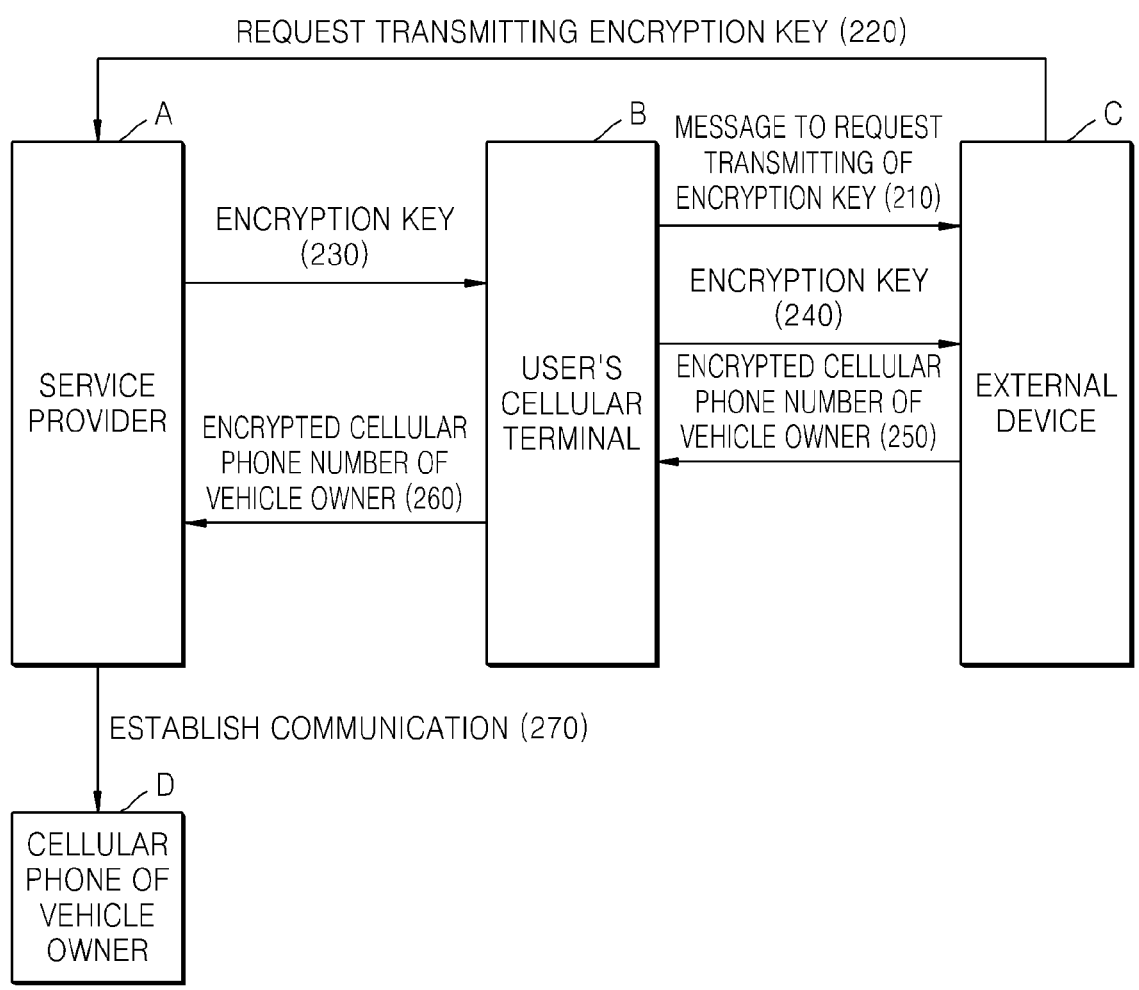
FIG. 2 is a diagram for describing a method of establishing communication via a service provider, according to another embodiment of the present invention.

FIG. 2 is a diagram for describing a method of establishing communication via a service provider, according to another embodiment of the present invention. Referring to FIG. 2, an external device C is installed in a vehicle by way of a non-limiting example. For instance, the external device C could be installed in the passenger compartment or in a location suitable for transmitting or receiving messages.

In operation 210, a user transmits a message requesting an encryption key to the external device C by using a cellular phone B of the user. The message requesting an encryption key may be composed of at least one number and one letter. For example, when a user wants to contact an owner of a vehicle parked in front of the user's house and finds a message on the external device C installed in the front of the vehicle requesting a code '4374*' to be entered, if the user enters the code '4374*' in the user's cellular phone B, a message requesting an encryption key may be transmitted to the external device C.

According to an aspect of the present invention, the user may also transmit a preset message to a service provider A via the user's cellular phone B to request the encryption key directly from the service provider A. For example, the user may dial a phone number contacting the service provider A by using the user's cellular phone B to request the encryption key from the service provider A.

In operation 220, the external device C requests the service provider A to transmit an encryption key to the user's cellular phone B. In operation 230, the service provider A transmits the encryption key to the user's cellular phone B. In operation 240, the user's cellular phone B transmits the encryption key, received from the service provider A, to the external device C. In operation 250, the external device C encrypts a cellular phone number of the vehicle owner by using the encryption key and transmits the encrypted cellular phone number to the user's cellular phone B. In operation 260, the user's cellular phone B transmits the encrypted cellular phone number, received from the external unit C, to the service provider A. In operation 270, the service provider A decrypts the encrypted cellular phone number to extract the vehicle owner's cellular phone number, and establishes communication between the user's cellular phone B and the vehicle owner's cellular phone based on the vehicle owner's cellular phone number.

When the service provider A is establishing communication between the user's cellular phone B and the vehicle owner's cellular phone D, the service provider A may inform the vehicle owner's cellular phone D that a phone call or a text message received by the vehicle owner's cellular phone D is either the phone call or the text message forwarded from the external device C installed in the vehicle. However, the identification may also be only of the transmitting cellular phone B.

Meanwhile, an unauthorized user, such as a spam mailer, may want to establish communication with the vehicle owner. In this case, a method of blocking communication between such the unauthorized user and the vehicle owner is necessary. Therefore, the service provider A may separately possess a database including a list of unauthorized transmitting terminals, for example, a list of cellular phone numbers of unauthorized users such as spam mailers. When the unauthorized user wants to establish communication with the vehicle owner, the service provider A may block communication between the unauthorized user and the vehicle owner based on the list. Such a list may be specific to a particular user and/or may be implemented system wide.

According to aspects of the present invention, when a user wants to communicate with a vehicle owner, communication between the user and the vehicle owner can be established without exposing the vehicle owner's phone number, and thus abuses of the vehicle owner's phone number can be prevented.

Figure 3:
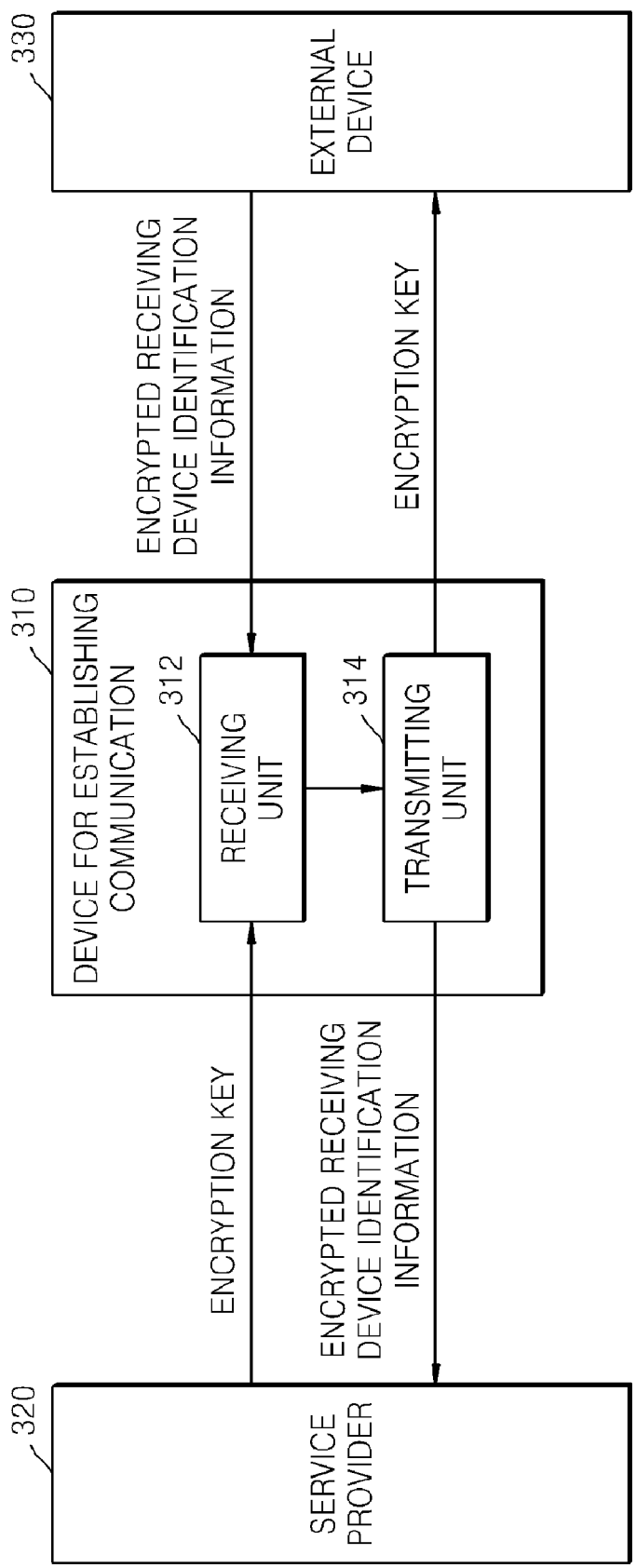
FIG. 3 is a diagram illustrating a device for establishing communication via a service provider, according to an embodiment of the present invention.

FIG. 3 is a diagram illustrating a device for establishing communication 310 according to an embodiment of the present invention. Referring to FIG. 3, the device for establishing communication 310 includes a receiving unit 312 and a transmitting unit 314. For convenience, a service provider 320 and an external device 330 are also illustrated in FIG. 3. Also, the device for establishing communication 310 is installed in a transmitting terminal, such as the terminal B of FIG. 1 or the cell phone B of FIG. 2, according to the current embodiment.

The receiving unit 312 receives an encryption key from the service provider 320. The transmitting unit 314 transmits the encryption key to the external device 330 storing receiving terminal identification information required for establishing communication with a receiving terminal (not shown). The encryption key could be received in response to a request from the device for establishing communication 310 to the service provider 320. Moreover, while described in terms of being received from the service provider 320, the encryption key could be pre-stored in other aspects, uploaded from a storage medium such as a flash drive, or could be received from another service provider instead of the service provider 320 which is to establish the communication.

Next, the receiving unit 312 receives the encrypted receiving terminal identification information from the external device 330. The external device 330 stores the receiving terminal identification information in a memory. Finally, the transmitting unit 314 transmits the encrypted receiving terminal identification information to the service provider 320. As such, the service provider 320 establishes a communication link between the transmitting unit 314 and the receiving unit (not shown) referenced by the external device 330.

As described previously, the device for establishing communication 310 can request an encryption key either from the service provider 320 or from the external device 330, and can receive the encryption key in response to the request. The device for establishing communication 310 may further include an encryption key requesting unit (not shown) requesting an encryption key.

The device for establishing communication 310 may also be able to establish communication with a receiving terminal without the service provider 320 according to an embodiment of the present invention. For example, the device for establishing communication 310 may have an encryption key and transmits the encryption key to the external device 330. The device for establishing communication 310 then receives the encrypted receiving terminal identification information encrypted by using the encryption key and decrypts the encrypted receiving terminal identification information to extract receiving terminal identification information. Thus, the device for establishing communication via a service provider 310 can establish communication with the receiving terminal (not shown) based on the receiving terminal identifification information without having to use the service provider 320. However, a user of the transmitting terminal should not be able to confirm the decrypted receiving terminal identification information, even if the user uses a separate device and/or a separate process.

Figure 4:
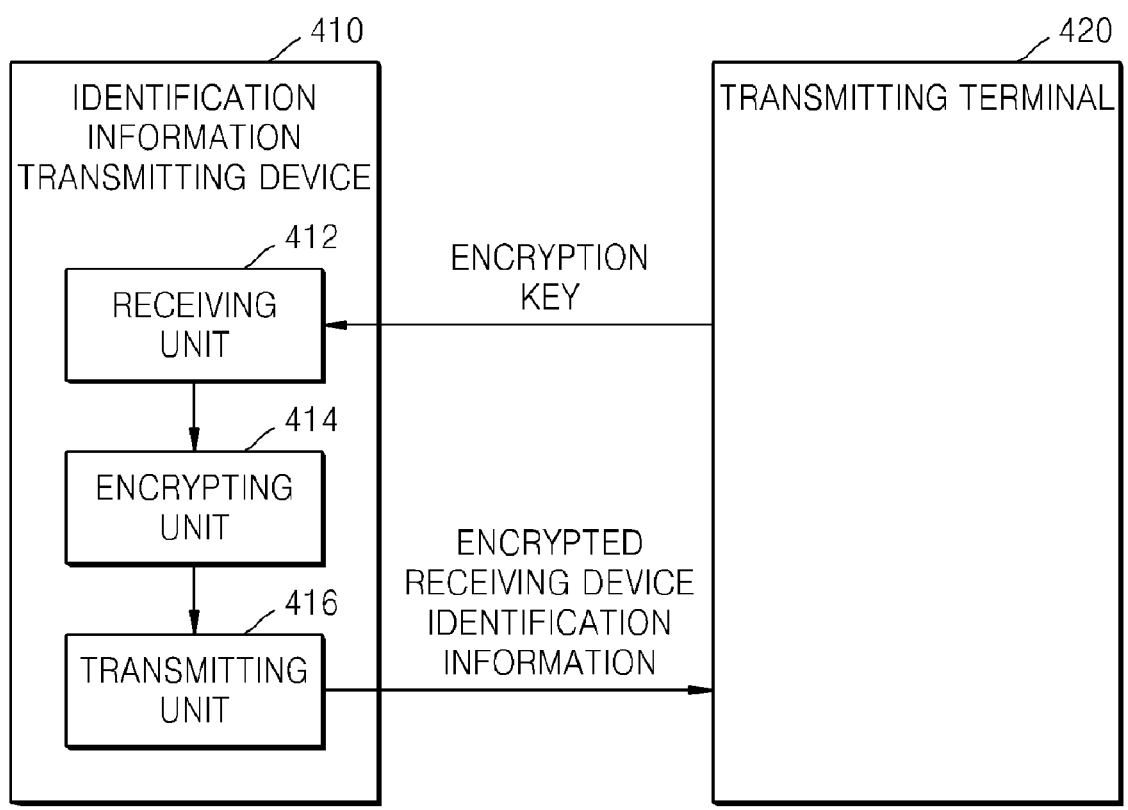
FIG. 4 is a block diagram of a receiving terminal identification information transmitting terminal according to an embodiment of the present invention.

While a method of establishing communication according to the present invention has been described up to now by focusing on the device for establishing communication 310 according to the present invention, a method of establishing communication according to the present invention will be described hereinafter by focusing on the aforementioned external device C of FIGS. 1 and 2. FIG. 4 is a block diagram of a receiving terminal identification information transmitting device 410 according to an embodiment of the present invention. Referring to FIG. 4, the identification information transmitting device 410 includes a receiving unit 412, an encrypting unit 414, and a transmitting unit 416. The receiving terminal identification information transmitting device 410 can be included in the external device C.

The receiving unit 412 receives an encryption key from a transmitting terminal 420. The encrypting unit 414 encrypts receiving terminal identification information required for establishing communication with a receiving terminal (not shown) by using the received encryption key. Such information can be stored in a memory of the device 410.

The transmitting unit 416 transmits the encrypted receiving terminal identification information to the transmitting terminal 420. The encryption key received from the transmitting terminal 420 is an encryption key transmitted to the transmitting terminal 420 from a service provider (not shown).

Also, as described above, when the transmitting terminal 420 transmits the encrypted receiving terminal identification information, which was received from the transmitting unit 416, to the service provider (not shown), the service provider (not shown) establishes communication between the transmitting terminal 420 and the receiving terminal (not shown) based on the receiving terminal identification information.

Figure 5:
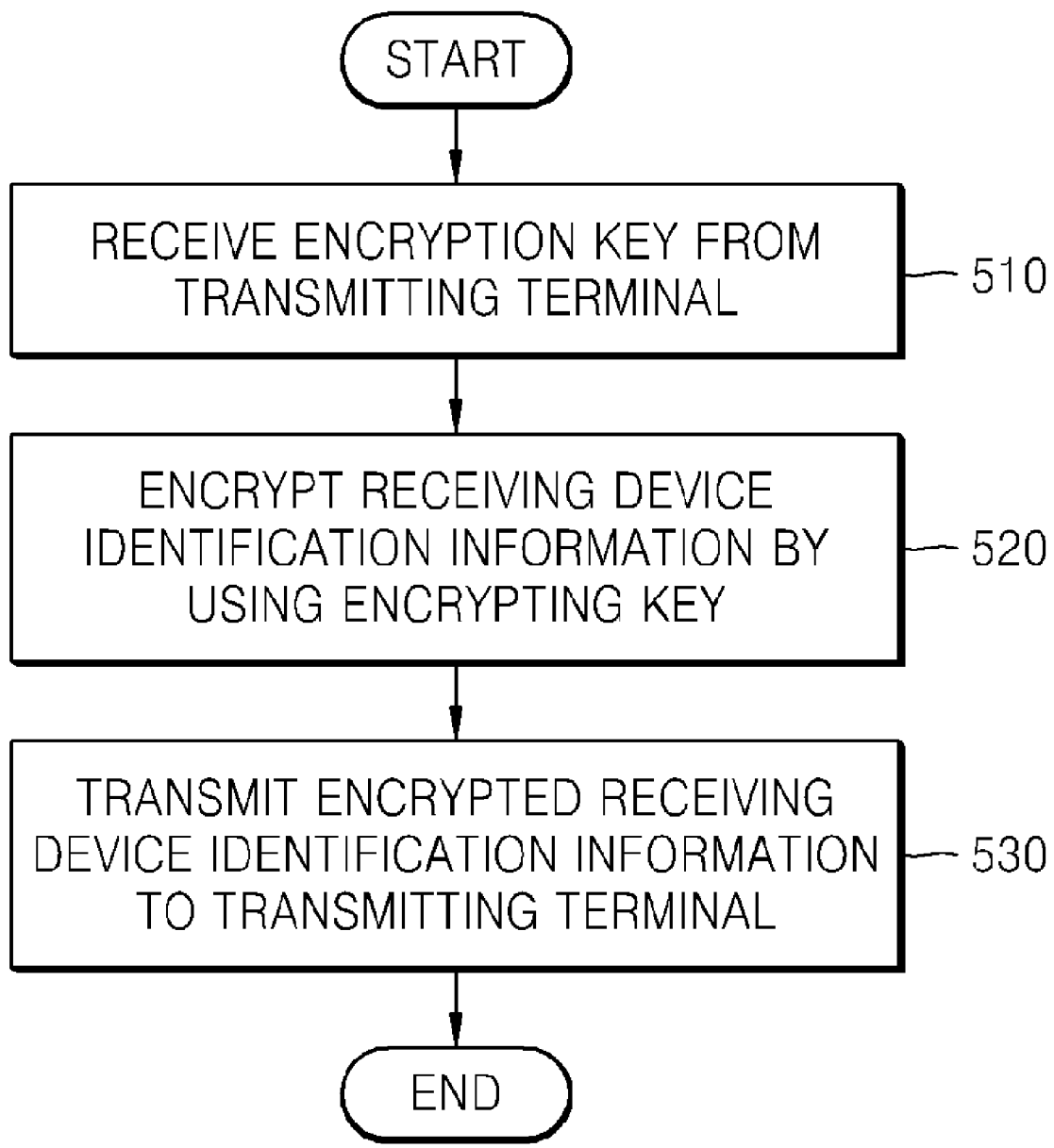
FIG. 5 is a flow chart illustrating a method of transmitting receiving terminal identification information, according to an embodiment of the present invention.

FIG. 5 is a flow chart illustrating a method of transmitting receiving terminal identification information, according to an embodiment of the present invention, shown with reference to FIG. 1. In operation 510, an encryption key is received from a transmitting terminal B. In operation 520, receiving terminal identification information, required for establishing communication with a receiving terminal D, is encrypted by using the encryption key. In operation 530, the encrypted receiving terminal identification information is transmitted to the transmitting terminal B.

While not required, aspects of the invention can also be embodied as computer readable code on one or more computer readable recording medium readable by a computer and/or processor. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. Aspects may also be implemented in carrier waves (such as data transmission through the Internet) readable by one or more processors and/or computers.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of establishing communication via a service provider providing a service of establishing communication between a transmitting terminal and a receiving terminal, the method comprising:
receiving at the transmitting terminal an encryption key from the service provider; transmitting the encryption key from the transmitting terminal to an external device, the external device storing receiving terminal identification information required for establishing communication with the receiving terminal;
receiving at the transmitting terminal the encrypted receiving terminal identification information from the external device in response to the transmitted encryption key; and
transmitting the encrypted receiving terminal identification information from the transmitting terminal to the service provider.

2. The method of claim 1, wherein the receiving terminal identification information comprises a cellular phone number of the receiving terminal, an e-mail address of a user of the receiving terminal, a device identifier specifying the receiving terminal or combinations thereof.

3. The method of claim 1, further comprising the transmitting terminal requesting the encryption key from the service provider or the external device, wherein the receiving at the transmitting terminal the encryption key from the service provider comprises receiving the encryption key from the service provider in response to the request for the encryption key to the service provider.

4. The method of claim 3, wherein the requesting of the encryption key comprises transmitting a message having at least one number and one letter to the external device or to the service provider.

5. The method of claim 1, wherein the service provider stores a list of unauthorized transmitting terminals to block communication between an unauthorized transmitting terminal and the receiving terminal, the method further comprises the service provider denying communication with the receiving terminal if the transmitting terminal is on the list.

6. The method of claim 1, wherein the receiving of the encryption key and the transmitting of the encrypted receiving terminal identification information to the service provider are performed using a digital wireless communication method, and the transmitting of the encryption key to the external device and the receiving of the encrypted receiving terminal identification information are performed using a short distance wireless communication method.

7. A method of transmitting receiving terminal identification information, required for establishing communication between a transmitting terminal and a receiving terminal, the method comprising:
receiving an encryption key at an external device transmitted from the transmitting terminal;
encrypting at the external device the receiving terminal identification information using the received encryption key; and
transmitting the encrypted receiving terminal identification information from the external device to the transmitting terminal.

8. The method of claim 7, wherein the encryption key is an encryption key received by the transmitting terminal from a service provider providing a service of establishing communication between the transmitting terminal and the receiving terminal.

9. A device for establishing communication via a service provider providing a service of establishing communication between a transmitting terminal and a receiving terminal, the device comprising:
   a receiving unit, implemented as hardware, receiving an encryption key from the service provider; and
   a transmitting unit transmitting the encryption key to an external device, the external device storing receiving terminal identification information required for establishing communication with the receiving terminal,
   wherein the receiving unit receives encrypted receiving terminal identification information from the external device encrypted at the external device using the transmitted encryption key, and the transmitting unit transmits the received encrypted receiving terminal identification information to the service provider.

10. The device of claim 9, wherein the receiving terminal identification information comprises a cellular phone number of the receiving terminal, an e-mail address of a user of the receiving terminal, a device identifier specifying the receiving terminal, or a combinations thereof.

11. The device of claim 9, further comprising an encryption key requesting unit requesting the encryption key from the service provider or the external device.

12. The device of claim 11, wherein the encryption key requesting unit requests the encryption key by transmitting a message having of at least one number and one letter to the external device or to the service provider.

13. The device of claim 9, wherein the service provider stores a list of unauthorized transmitting terminals to block communication between an unauthorized transmitting terminal and the receiving terminal.

14. The device of claim 9, wherein the receiving unit and the transmitting unit perform receiving and transmitting operations by using a digital wireless communication method and/or a short distance wireless communication method.

15. An external device for transmitting receiving terminal identification information required for establishing communication between a transmitting terminal and a receiving terminal, the external device comprising:
   a receiving unit, implemented as hardware, receiving an encryption key from the transmitting terminal;
   an encrypting unit encrypting the receiving terminal identification information stored within the external device using the received encryption key; and
   a transmitting unit transmitting the encrypted receiving terminal identification information to the transmitting terminal.

16. The device of claim 15, wherein the encryption key is an encryption key received by the transmitting terminal from a service provider providing a service of establishing communication between the transmitting terminal and the receiving terminal.

17. A non-transitory computer readable recording medium, having recorded thereon a computer program to implement the method of claim 1 and which is executed by one or more computers.

18. The device of claim 15, wherein the transmitting terminal comprises a mobile phone which connects to the receiving unit using a short distance wireless communication method to request communication with the receiving terminal, and the transmitting unit sends a request to the service provider to provide the encryption key from the service provider to the mobile phone according to the request.

19. A method of establishing communication between a transmitting terminal and a receiving terminal using an external device, the method comprising:
   receiving from the transmitting terminal encrypted receiving terminal identification information encrypted by the external device using an encryption key transmitted from the transmitting terminal to the external device;
   decrypting the encrypted receiving terminal identification information using the encryption key; and
   establishing a communication link between the transmitting terminal and the receiving terminal using the decrypted receiving terminal identification information.

20. The method of claim 19, further comprising, prior to the receiving from the transmitting terminal encrypted receiving terminal identification information,
   receiving a request for the encryption key needed to establish communication with the receiving terminal; and
   transmitting the encryption key to the transmitting terminal to provide to the external device storing receiving terminal identification information required for establishing communication with the receiving terminal.

21. The method of claim 20, wherein the receiving the request for the encryption key comprises receiving the request from the external device sent in response to a request from the transmitting terminal to the external device to establish communication with the receiving terminal.

22. The method of claim 20, wherein the receiving the request for the encryption key comprises receiving the request from the transmitting terminal to establish communication with the receiving terminal.

23. The method of claim 19, wherein the receiving terminal identification information comprises a mobile phone number of the receiving terminal, an e-mail address of a user of the receiving terminal, a device identifier specifying the receiving terminal or combinations thereof.

24. The method of claim 19, wherein the establishing the communication link between the transmitting terminal and the receiving terminal comprises comparing an identification of the transmitting terminal to a list of unauthorized transmitting terminals, establishing the communication link where the transmitting terminal is not on the list, and blocking the communication link where the transmitting terminal is on the list.

25. The method of claim 19, wherein the establishing the communication link comprises establishing the link using a digital wireless communication method.

26. The method of claim 25, wherein the receiving terminal comprises a mobile phone and the transmitting terminal comprises another mobile phone.

* * * * *